(12) United States Patent
Himes et al.

(10) Patent No.: US 6,704,157 B2
(45) Date of Patent: Mar. 9, 2004

(54) PASSIVE DAMPING METHOD AND CIRCUIT FOR DATA STORAGE DEVICE ACTUATOR

(75) Inventors: Adam Karl Himes, Minneapolis, MN (US); John Wright, Edina, MN (US); David Gordon Qualey, Apple Valley, MN (US); David Allen Sluzewski, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 353 days.

(21) Appl. No.: 09/835,714

(22) Filed: Apr. 16, 2001

(65) Prior Publication Data

US 2002/0012184 A1 Jan. 31, 2002

Related U.S. Application Data

(60) Provisional application No. 60/197,772, filed on Apr. 14, 2000.

(51) Int. Cl.[7] .............................................. G11B 21/02
(52) U.S. Cl. .................... 360/75; 360/78.09; 360/78.12
(58) Field of Search ................. 360/75, 78.09, 360/78.12, 97.02, 244.2; 310/317

(56) References Cited

U.S. PATENT DOCUMENTS

| | | | |
|---|---|---|---|
| 4,414,497 A | 11/1983 | Song | |
| 4,565,940 A | 1/1986 | Hubbard, Jr. | |
| 4,724,370 A | 2/1988 | Moraru et al. | |
| 4,760,478 A | 7/1988 | Pal et al. | |
| 4,819,094 A | 4/1989 | Oberg | |
| 4,991,045 A | 2/1991 | Oberg | |
| 5,079,653 A | 1/1992 | Gauthier et al. | |
| 5,315,203 A | 5/1994 | Bicos | |
| 5,374,011 A | 12/1994 | Lazarus et al. | |
| 5,384,676 A | 1/1995 | Yokoyama et al. | |
| 5,530,396 A | 6/1996 | Vlatkovic et al. | |
| 5,558,477 A | 9/1996 | Browning et al. | |
| 5,656,882 A | 8/1997 | Lazarus et al. | |
| 5,764,444 A * | 6/1998 | Imamura et al. | 360/294.4 |
| 5,783,898 A | 7/1998 | Wu | |
| 5,808,837 A * | 9/1998 | Norton | 360/254.3 |
| 5,862,015 A * | 1/1999 | Evans et al. | 360/244.1 |
| 5,880,626 A | 3/1999 | Dean | |
| 5,909,342 A | 6/1999 | Forbord et al. | |
| 6,034,834 A * | 3/2000 | Yoshikawa et al. | 360/75 |
| 6,100,623 A * | 8/2000 | Huang et al. | 310/317 |
| 6,310,746 B1 * | 10/2001 | Hawwa et al. | 360/97.01 |
| 6,351,341 B1 * | 2/2002 | Lee et al. | 360/75 |

* cited by examiner

Primary Examiner—Andrew L. Sniezek
Assistant Examiner—K. Wong
(74) Attorney, Agent, or Firm—Merchant & Gould P.C.

(57) ABSTRACT

Passive damping of a disc drive structural member is achieved using a tuned resonance passive damping circuit. This circuit can, for example, be connected to a head gimbal assembly that has a piezoelectric micro-actuator. The circuit can be tuned to the sway frequency of the micro-actuator. The circuit is configured to dissipate mechanical energy as heat, effectively damping the structure to which it is attached.

16 Claims, 3 Drawing Sheets

PASSIVE DAMPING METHOD AND CIRCUIT FOR DATA STORAGE DEVICE ACTUATOR

CROSS-REFERENCE TO RELATED APPLICATIONS

This application claims the benefit of U.S. Provisional Application Serial No. 60/197,772, filed Apr. 14, 2000 entitled "PASSIVE DAMPING CIRCUIT FOR DATA STORAGE DEVICE ACTUATOR", which application is incorporated by reference herein.

FIELD OF THE INVENTION

The invention relates generally to data storage device actuators. More particularly, the invention relates to a circuit and method for passive damping of resonance frequency vibrations in data storage device actuators.

BACKGROUND OF THE INVENTION

Rotating disc magnetic recording systems typically employ magnetic head transducers which glide over the magnetic disc media on a cushion of air. The mounting or support structure which carries the transducers are termed "sliders." Sliders have air-bearing surfaces that are propelled off the surface of moving media by boundary air which moves with the media disc. The air-bearing surface of a slider is aerodynamically designed to glide on the boundary air due to a pattern of raised rails and recesses which establish the "fly height" of the slider. Read/write transducers are mounted on the rear side of the slider, with the reader sensor and writer gap at the air-bearing surface, facing the moving media.

A slider assembly typically includes a ceramic slider and associated read/write heads, a support flexure arm, interconnection wires between the heads and external signaling devices, and any associated mounting hardware. The slider assembly is mounted on an arm which is movable over the surface of a rotating magnetic disc to position the slider adjacent selected tracks on the disc. Disc drives usually employ multiple discs which rotate together, spaced apart from one another on a single spindle. One slider assembly is provided for each magnetic recording surface in a disc drive.

In magnetic disc drive data storage devices, digital data are written to and read from a thin layer of magnetizable material on a surface of one or more rotating discs. Write and read operations are performed through write and read transducers. The slider and transducers are sometimes collectively referred to as a head, and typically a single head is associated with each disc surface. When the read transducer is a magnetoresistive (MR) type sensor, the combination of the slider and the transducer are frequently referred to as a MR head. The head is selectively moved under the control of electronic circuitry to any one of a plurality of circular, concentric data tracks on the disc surface by an actuator device. Each slider body includes an air bearing surface (ABS). As the disc rotates, the disc drags air beneath the ABS, which develops a lifting force that causes the head to lift and fly above the disc surface.

The storage capacity of magnetic disc drive data storage devices continues to increase rapidly. One way in which the storage capacity can be increased is to add more tracks, i.e., by making each track narrower. As the tracks become more narrow and the space between adjacent tracks decreases, the performance demands placed on the actuator to accurately follow a particular track increases. Unfortunately, the tracking ability of the actuator is affected by a number of factors, one of which is resonance.

Most structures have at least one resonance frequency. A structure that receives a resonant frequency as an input can oscillate at a significant amplitude. Slider assemblies and the arms on which they are mounted are not immune to this phenomenon, as slider assemblies are known to resonate at their natural frequencies. The support flexure arm, or suspension, on which the slider is mounted provides the flexibility necessary for the slider body to move vertically in relation to the disc surface. Unfortunately, the support flexure arm also provides a source of vibration as this suspension can oscillate.

Moreover, a given slider assembly that is actively involved in reading and writing can be adversely affected by vibrations in another assembly that is not actively reading and writing. These vibrations degrade the ability of the actuator to follow a particular track on the disc and thus impairs the ability of the head to read to the disc and read from the disc.

In particular, a single actuator arm typically carries two suspensions. One suspension carries a slider or head that reads and writes on the disc above the actuator arm while the other suspension carries a slider or head that reads and writes on the disc below the actuator arm. Only one of the pair of suspensions are actively tracking (and reading and writing) at a time. However, vibrations within a non-actively tracking suspension can negatively impact on the actively tracking suspension.

Thus, damping treatments of one form or another are typically applied. A previous attempt to resolve resonance vibration has been to add a mechanical damper. For instance, a viscoelastic member can be placed on a suspension in order to provide some level of damping. This is illustrated, for example, in U.S. Pat. No. 4,760,478. Alternatively, the particular suspension can be made from materials having improved damping characteristics, as described in U.S. Pat. No. 4,991,045. U.S. Pat. No. 5,909,342 employs particularly designed flexible printed circuits to provide damping.

Unfortunately, mechanical solutions are not without problems. Typically, mechanical damping requires additional components, which translates into greater mass and greater assembly complexity. Moreover, mechanical damping solutions generally require a significant surface area in order to be effective. This has become more of a problem as disc drive actuator systems have become increasingly smaller.

Thus, another possible solution is to actively compensate for excessive vibrations by using a closed loop servo control algorithm. This is described, for example, in U.S. Pat. Nos. 4,414,497; 4,724,370; and 5,079,653. While active servo control such as this is indeed useful in reducing vibration magnitude, there are limitations. For example, in order to provide control over a wide range of frequencies, it is often times not practical to implement an algorithm specifically directed to reducing vibrations at a single frequency. Moreover, with active control, damping is limited to structures being actively controlled.

Piezoelectric materials have been used in other industries for their useful properties. In particular, a piezoelectric material will produce a current in response to a strain and will conversely strain in response to a current. For example, U.S. Pat. No. 5,783,898 describes the combination of a piezoelectric material with a shunt circuit for controlling vibrations in aircraft and the like. U.S. Pat. No. 5,315,203 discloses the use of opposing piezoelectric materials suitable for various large structures.

Thus, a need remains for improved methods of damping vibrations in disc drive components such as slider assemblies and actuators. A need remains for improved methods of controlling resonance frequency vibrations in disc drive components such as slider assemblies and actuators.

The present invention provides a solution to this and other problems, and offers other advantages over the prior art.

SUMMARY OF THE INVENTION

According to a first aspect of the present invention, there is provided a suspension assembly that includes an upper suspension and a lower suspension that is arranged in parallel with the upper suspension. A piezoelectric structure is configured in conjunction with one of the upper suspension and the lower suspension and a damping circuit is electrically coupled to the piezoelectric structure. The piezoelectric structure generates an electrical current in response to a vibration within the piezoelectric structure. This electrical current is dissipated as heat by passing through the damping circuit that becomes at least substantially resistive at the vibration frequency.

According to another aspect of the present invention, there is provided a suspension assembly that includes energizing means that generate an electrical current in response to a resonant frequency vibration within the energizing means and dissipation means that dissipates energy in the form of heat at the natural resonance frequency of the energizing means.

In accordance with yet another aspect of the present invention, there is provided a method of damping vibrations in a disc drive component. The method includes providing the disc drive component with a piezoelectric element that is physically integrated into the disc drive component and then determining a resonant frequency for the integrated disc drive component and piezoelectric element. A circuit is designed that becomes resistive at the resonant frequency of the integrated disc drive component and piezoelectric element, and the piezoelectric element is electrically coupled to the circuit, thereby dissipating resonant frequency vibrations as heat.

In accordance with yet another aspect of the present invention, there is provided a method of damping vibrations in a suspension assembly that includes an upper suspension and a lower suspension, in which piezoelectric micro-actuators located in or near each of the upper suspension and the lower suspension are used for fine tracking control. The method includes determining a resonant frequency of the upper suspension and the lower suspension, connecting a damping circuit to the piezoelectric micro-actuators, the circuit being designed to become resistive at the resonant frequency of the upper and lower suspension, and damping vibrations by converting mechanical energy first into electrical energy and then into thermal energy.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PRESENTLY PREFERRED EMBODIMENTS

The following description is a detailed description of the preferred embodiments presently contemplated for carrying out the present invention. This description is made for the purpose of illustrating the general principles of the present invention and is not meant to limit the inventive concepts claimed herein.

Figure 1:
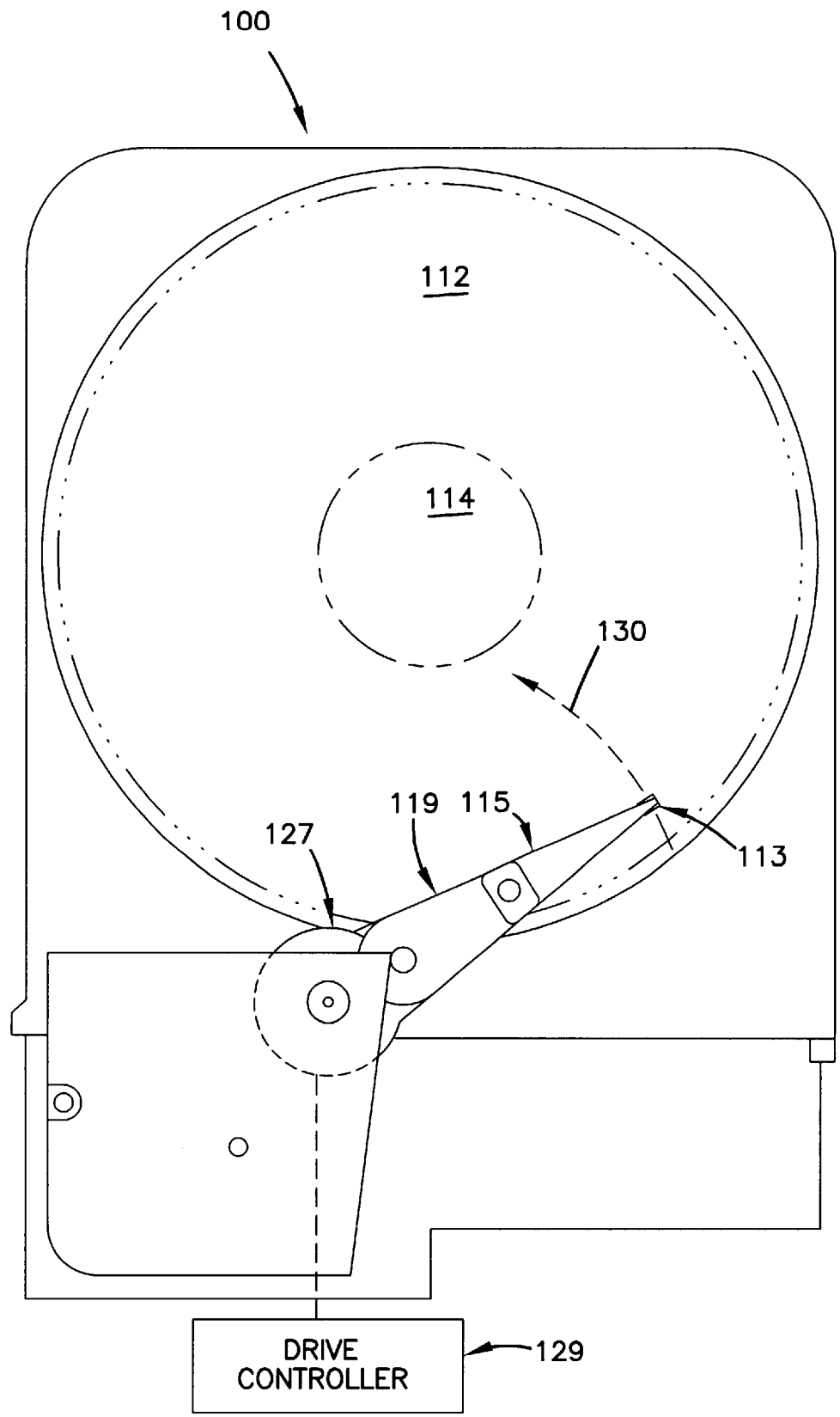
FIG. 1 is a simplified schematic drawing of a magnetic recording disc system.

FIG. 1 is a simplified schematic diagram of a disc drive system 100 embodying the present invention. As shown in FIG. 1, at least one rotatable magnetic disc 112 is supported on a spindle 114 and rotated by a disc drive motor. The magnetic recording media on each disc is in the form of an annular pattern of concentric data tracks (not shown) on disc 112.

At least one slider 113 is positioned on the disc 112, each slider 113 supporting one or more magnetic read/write heads incorporating the present invention. As the discs 112 rotate, slider 113 is moved radially in and out as shown by arrow 130 over the disc surface so that the heads located on the slider 113 may access different portions of the disc where desired data is either recorded or written to. Each slider 113 is attached to an actuator arm 119 by a suspension 115. The suspension 115 provides a slight spring force which biases the slider 113 against the disc surface. Each actuator arm 119 is attached to an actuator 127.

During operation of the disc storage system, the rotation of disc 112 generates an air bearing between an air bearing surface (ABS) on the slider 113 and the disc 112. The ABS is the surface of slider 113 which faces the surface of the disc. The air bearing exerts an upward force or lift on the slider 113. The air bearing thus counter-balances the slight spring force of suspension 115 and supports the slider 1 13 slightly above the disc 112 surface by a small, substantially constant spacing during normal operation.

The various components of the disc storage system are controlled in operation by control signals generated by a drive controller 129, such as access control signals and internal clock signals. Typically, the drive controller 129 includes logic control circuits, storage and a microprocessor. The drive controller 129 generates control signals to control various system operations such as drive motor control signals and head position and seek control signals. The control signals provide the desired current profiles to optimally move and position slider 113 to the desired data track on disc 112 as is well known.

The above description of a typical magnetic disc storage system, and the accompanying illustration of FIG. 1 are for representation purposes only. It should be apparent that disc storage systems may contain a large number of discs and actuators, and each actuator may support a number of sliders.

Figure 2:
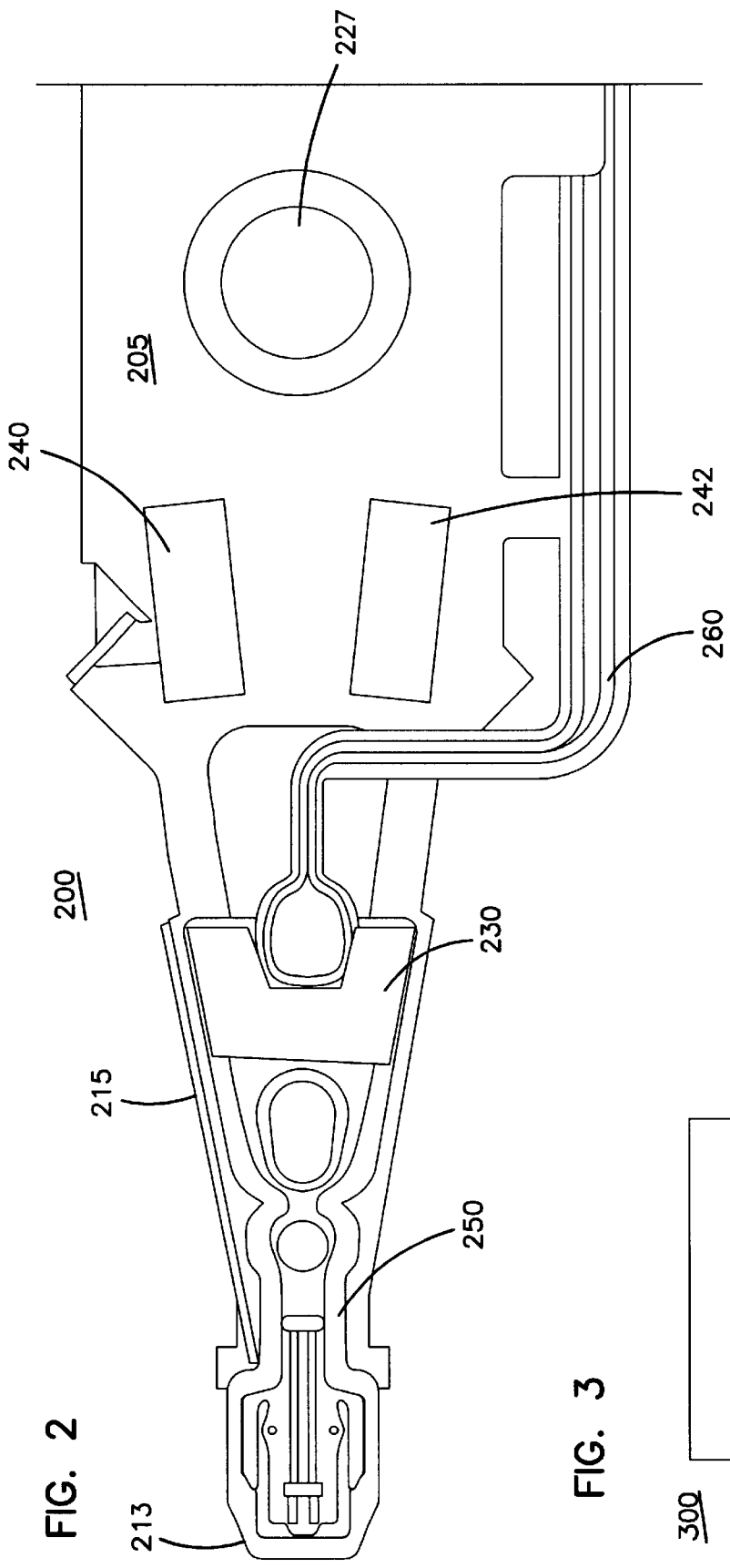
FIG. 2 is an illustration of a suspension assembly equipped with piezoelectric micro-actuators. This Figure also illustrates the use of mechanical damping.
Figure 4:
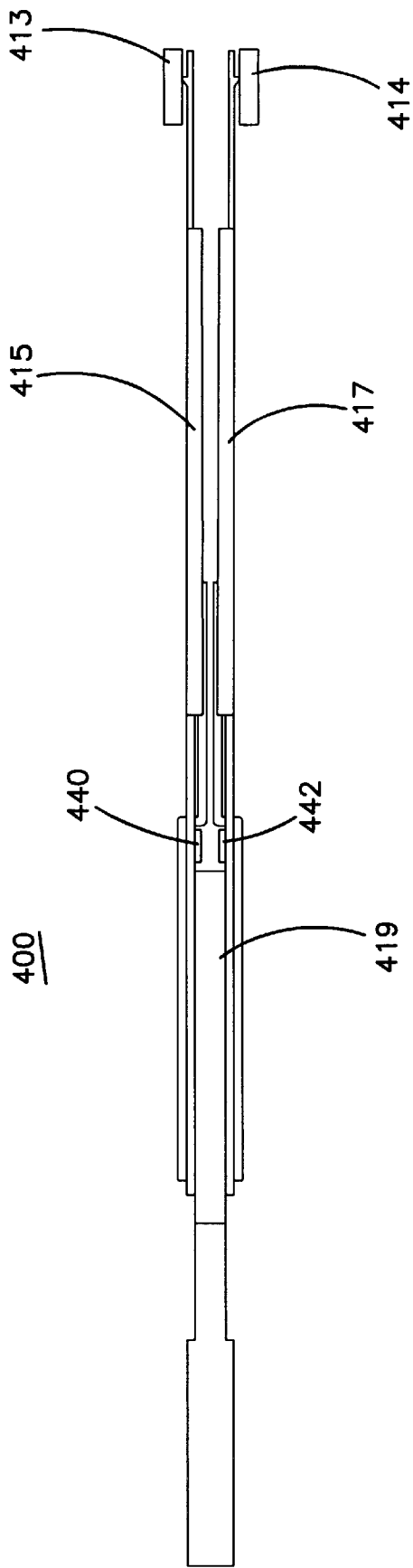
FIG. 4 is a side elevation view of a typical actuator arm and suspension assembly as is useful in a preferred embodiment of the present invention.

FIG. 2 illustrates a suspension assembly 200 that is attached to an actuator arm (not illustrated in this FIG.) through a swage boss 205. A slider 213 is operatively connected to a suspension 215 that in turn mounts onto the actuator arm through the swage boss 205. Typically, there would be two suspensions 415, 417 (as seen in FIG. 4), but only one is visible in this top plan view. The slider is electrically connected to the suspension assembly 200 via a flexible interconnect circuit 250.

FIG. 4 provides a side view of a suspension assembly 400, illustrating an upper suspension 415 and a lower suspension 417, each attached to an actuator arm 419. An upper slider 413 is operatively connected to the upper suspension 415 while a lower slider 414 is operatively connected to the lower suspension 417. FIG. 4 also illustrates the possible placement of an upper piezoelectric structure 440 and a lower piezoelectric structure 442.

In this, the terms upper and lower refer merely to the relative positions in the illustrated embodiments. These terms are intended to be illustrative, rather than limiting in any way.

In use, the upper slider 413 would read and write on a disc (not illustrated) that is positioned above the suspension assembly 400 while the lower slider 414 would read and write on a disc (also not illustrated) that is positioned beneath the suspension assembly 400. Only one of the upper slider 413 and the lower slider 414 will actively track follow at a particular time. While one of the upper slider 413 and the lower slider 414 are actively reading and writing, the other of the upper slider 413 and the lower slider 414 are inactive.

A suspension assembly 200 can include one or more piezoelectric micro-actuators 240, 242. These micro-actuators 240, 242 are used for fine tracking control. As such, control circuitry 260 is used to provide an appropriate signal to the micro-actuators 240, 242. As is well known in the art, piezoelectric materials are useful in that they can flex in response to an electrical input. Thus, they can be used for the small movements necessary for fine tracking control.

Moreover, as is well known in the art, piezoelectric materials can also produce an electrical signal in response to movement or vibration. While a variety of piezoelectric materials are known in the art, it is preferred that the piezoelectric materials used in the present invention be PZT (lead zirconate titanate or $Pb(TiZr)O_3$).

The present invention utilizes the phenomenon that piezoelectric materials generate a voltage in response to vibration. A tuned resonance passive damping circuit 300 (see FIG. 3) is electrically coupled to a structural member, i.e., an actuator, to reduce vibrations of the structure at the natural frequency of the circuit.

As illustrated in FIG. 2, a suspension assembly 200 in accordance with a preferred embodiment of the present invention can also include one form or another of mechanical damping. While a number of different forms of mechanical damping are known to those of skill in the art, a preferred embodiment includes adding a layer of elastomeric material 230 over a portion of the suspension assembly 215. This is also described in U.S. Pat. No. 4,760,478, which is hereby incorporated by reference.

Alternatively, the suspension assembly 200 can be made from materials that have more desirable vibrational characteristics. Examples of this can be found in U.S. Pat. Nos. 5,909,342, 4,991,045, which are hereby incorporated by reference.

Figure 3:
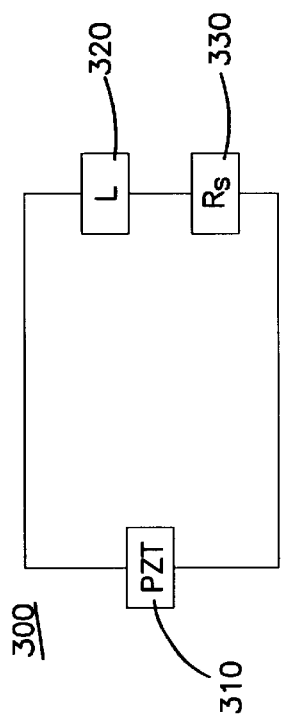
FIG. 3 is a schematic illustration of a circuit that can be used in accordance with a preferred embodiment of the present invention.

FIG. 3 provides an illustration of a damping circuit 300 according to a preferred embodiment of the present invention. The damping circuit 300 includes the piezoelectric suspension micro-actuator 310 of a disc drive 100 (see FIG. 1), an inductance L 320 and a resistance $R_S$ 330. $R_S$ represents a series resistance that includes the resistance of the inductor and any additional resistor that may be included.

With the exception of the PZT element(s), the rest of the damping circuit 300 can be located almost anywhere, although it is preferred that the damping circuit 300 be located either in or near the preamp (not shown). The PZT element(s) can be connected to the rest of the circuit through a flexible interconnect circuit 250.

This passive damping circuit 300 has a natural frequency $F_R$ that is defined by the formula:

$$F_R = \frac{1}{2\pi\sqrt{LC}}\sqrt{1 - \frac{CR_S^2}{L}}$$

where C is defined as the capacitance provided by the piezoelectric material.

When a voltage is applied at the natural frequency of the damping circuit 300, the damping circuit 300 becomes completely resistive. Voltage applied across a resistive circuit dissipates energy in the form of heat, effectively adding damping to the structure.

As noted above, only one of the pair of sliders 413, 414 actively read and write at a particular time. However, vibration that occurs in the suspension 415, 417 associated with the non-active slider 413, 414 can negatively impact the active slider 413, 414. Thus, it is preferred that the damping circuit 300 be in electrical communication with the piezoelectric structures 440, 442 present on the suspension 415, 417 that is attached to the non-active slider 413, 414. Consequently, vibrations occurring in the non-active suspension 415, 417 are damped and thus have a reduced impact on the active suspension 415, 417.

In summary, a suspension assembly 400 includes an upper suspension 415 and a lower suspension 417 that is arranged in parallel with the upper suspension 415. A piezoelectric structure 440, 442 is located on one of the upper suspension 415 and the lower suspension 417 and a damping circuit 300 is electrically coupled to the piezoelectric structure 440, 442. Preferably, the piezoelectric structure 440, 442 generates an electrical current in response to a vibration within the piezoelectric structure 440, 442. This electrical current is dissipated as heat by passing through the damping circuit 300 that becomes at least substantially resistive at the vibration frequency. Preferably, the vibration frequency is a resonant frequency of the piezoelectric structure 440, 442.

In a preferred embodiment, there is an upper slider 413 located on the upper suspension 415 and a lower slider 414 located on the lower suspension 417. Preferably, the suspension assembly 400 also includes another piezoelectric structure 440, 442 located on the other of the upper suspension 415 and the lower suspension 417. Preferably, the piezoelectric structure 440 on the upper suspension 415 and the piezoelectric structure 442 on the lower suspension 417 each include a piezoelectric micro-actuator. Alternatively, the piezoelectric structures 440, 442 can be added solely for damping purposes.

Preferably, the damping circuit 300 has a natural frequency $F_R$ that is defined by the formula:

$$F_R = \frac{1}{2\pi\sqrt{LC}} \sqrt{1 - \frac{CR_S^2}{L}}$$

wherein L is defined as inductance, $R_S$ is defined as resistance, and C is defined as the capacitance of the piezoelectric material.

In a preferred embodiment, the suspension 200 also employs mechanical damping measures 230. The suspension assembly 200 can include control circuitry, and preferably the damping circuit 300 is in line with the control circuitry.

Preferably, when one of the upper suspension 415 and the lower suspension 417 is actively reading or writing, the piezoelectric structure 440, 442 located on the other of the upper suspension 415 and the lower suspension 417 provides a current to the damping circuit 300, thereby damping vibration within the suspension 415, 417 that is actively involved in reading or writing.

There is provided an suspension assembly 200, 400 that includes energizing means that generate an electrical current in response to a resonant frequency vibration within the energizing means and dissipation means that dissipates energy in the form of heat at the natural resonance frequency of the energizing means. Preferably, mechanical damping means 230 for mechanically damping vibrations are also used.

Preferably, the energizing means include a piezoelectric element 440, 442. In a preferred embodiment, the dissipation means include a damping circuit 300 that becomes resistive at the natural resonance frequency of the piezoelectric structure 440, 442. Preferably, the natural frequency $F_R$ is defined by the formula:

$$F_R = \frac{1}{2\pi\sqrt{LC}} \sqrt{1 - \frac{CR_S^2}{L}}$$

wherein L is defined as inductance, $R_S$ is defined as resistance, and C is defined as the capacitance of the piezoelectric material.

Also provided is a method of damping vibrations in a disc drive component, the method including providing the disc drive component with a piezoelectric element 440, 442 that is physically integrated into the disc drive component. A resonant frequency is determined for the integrated disc drive component and piezoelectric element 440, 442 and a circuit 300 is designed that becomes resistive at the resonant frequency of the integrated disc drive component and piezoelectric element 440, 442. The piezoelectric element 440, 442 is electrically connected to the circuit 300, thereby dissipating resonant frequency vibrations as heat.

Preferably, mechanical damping means 230 for mechanically damping vibrations are also used.

There is provided a method of damping vibrations in a suspension assembly 200, 400 that includes an upper suspension 415 and a lower suspension 417, in which piezoelectric micro-actuators 440, 442 located in each of the upper suspension 415 and the lower suspension 417 are used for fine tracking control. The method includes determining a resonant frequency of the upper suspension 415 and the lower suspension 417, connecting a damping circuit 300 to the piezoelectric micro-actuators 440, 442, the circuit 300 being designed to become resistive at the resonant frequency of the upper and lower suspensions 415, 417, and damping vibrations by converting mechanical energy first into electrical energy and then into thermal energy.

In a preferred embodiment, only one of the upper suspension 415 and the lower suspension 417 are actively reading or writing at a particular time. Preferably, vibrations in the suspension 415, 417 that is actively reading or writing are damped by electrically coupling the damping circuit 300 to the piezoelectric micro-actuators 440, 442 located in the suspension 415, 417 that is not actively reading or writing.

While the invention has been described with reference to specific embodiments, it will be apparent to those skilled in the art that many alternatives, modifications and variations may be made. Accordingly, the present invention is intended to embrace all such alternatives, modifications and variations that may fall within the spirit and scope of the appended claims.

We claim:

1. A suspension assembly comprising:

an upper suspension;

a lower suspension arranged in parallel with the upper suspension;

a piezoelectric structure arranged in conjunction with one of the upper suspension and the lower suspension, the piezoelectric structure generating an electrical current in response to a vibration within the piezoelectric structure; and a damping circuit electrically coupled to the piezoelectric structure, the electrical current being dissipated as heat by passing through the damping circuit that becomes at least substantially resistive at the vibration frequency;

wherein when one of the upper suspension and the lower suspension is actively reading or writing, the piezoelectric structure arranged in conjunction with the other of the upper suspension and the lower suspension provides a current to the damping circuit, thereby damping vibration within the suspension arm that is actively involved in reading or writing.

2. The suspension assembly of claim 1, further comprising an upper slider located on the upper suspension and a lower slider located on the lower suspension.

3. The suspension assembly of claim 1, further comprising another piezoelectric structure arranged in conjunction with the other of the upper suspension and the lower suspension.

4. The suspension assembly of claim 3, wherein the piezoelectric structure arranged in conjunction with the upper suspension and the piezoelectric structure arranged in conjunction with the lower suspension each comprise a piezoelectric micro-actuator.

5. The suspension assembly of claim 1, wherein the vibration frequency comprises a resonant frequency of the piezoelectric structure.

6. The suspension assembly of claim 1, wherein the piezoelectric structure is added to the actuator solely for damping purposes.

7. The suspension assembly of claim 1, wherein the damping circuit has a natural frequency $F_R$ that is defined by the formula:

$$F_R = \frac{1}{2\pi\sqrt{LC}} \sqrt{1 - \frac{CR_S^2}{L}}$$

wherein:

L is defined as inductance;

$R_S$ is defined as resistance; and

C is defined as capacitance.

8. The suspension assembly of claim 1, further comprising a mechanical damping device separate and distinct from the piezoelectric structure.

9. The suspension assembly of claim 1, wherein the actuator arm further comprises control circuitry and wherein the damping circuit is in line with the control circuitry.

10. An suspension assembly comprising:
   energizing means that generate an electrical current in response to a resonant frequency vibration within the energizing means;
   dissipation means that dissipates energy in the form of heat at the natural resonance frequency of the energizing means; and
   mechanical damping means separate and distinct from the piezoeletric structure for mechanically damping vibrations.

11. The suspension assembly of claim 10, wherein the energizing means comprises a piezoelectric element.

12. The suspension assembly of claim 10, wherein the dissipation means comprises a damping circuit that becomes resistive at the natural resonance frequency of the piezolelectric structure.

13. The suspension assembly of claim 12, wherein the natural frequency $F_R$ is defined by the formula:

$$F_R = \frac{1}{2\pi\sqrt{LC}}\sqrt{1 - \frac{CR_S^2}{L}}$$

wherein:
   L is defined as inductance;
   $R_S$ is defined as resistance; and
   C is defined as capacitance.

14. A method of damping vibrations in a disc drive component, the method comprising steps of:
   providing the disc drive component with a piezolelectric element, the piezoelectric element being physically integrated into the disc component;
   determining a resonant frequency for the integrated disc drive component and piezoelectric element;
   designing a circuit that becomes resistive at the resonant frequency of the integrated disc drive component and piezoelectric element;
   electrically connecting the piezoelectric element to the circuit, thereby dissipating resonant frequency vibrations as heat; and
   augmenting the recited damping method with dampening provided by a mechanical damping device separate and distinct from the piezoelectric structure.

15. A method of damping vibrations in a suspension assembly comprising an upper suspension and a lower suspension, in which piezoelectric micro-actuators located in or near each of the upper suspension and the lower suspension are used for fine tracking control, the method comprising steps of:
   determining a resonant frequency of the upper suspension and the lower suspension;
   connecting a damping circuit to the piezoelectric microactuators, the circuit being designed to become resistive at the resonant frequency of the upper and lower suspension;
   actively reading or writing with only one of the upper and the lower suspensions at a particular time; and
   damping vibrations in the suspension that is actively reading or writing by converting mechanical energy from vibrations in the suspension that is not actively reading or writing first into electrical energy and then into thermal energy.

16. The method of claim 15, wherein the step of damping vibrations comprises damping vibrations in the suspension that is actively reading or writing by electrically coupling the damping circuit to the piezoelectric micro-actuators located in the suspension that is not actively reading or writing.

\* \* \* \* \*

UNITED STATES PATENT AND TRADEMARK OFFICE
CERTIFICATE OF CORRECTION

PATENT NO. : 6,704,157 B2
DATED : March 9, 2004
INVENTOR(S) : Himes et al.

It is certified that error appears in the above-identified patent and that said Letters Patent is hereby corrected as shown below:

Column 9,
Line 36, "with a piezolelectric" should read -- with a piezoelectric --
Line 38, "disc component;" should read -- disc drive component; --

Signed and Sealed this

Thirteenth Day of July, 2004

JON W. DUDAS
*Acting Director of the United States Patent and Trademark Office*